(12) United States Patent
Hampel et al.

(10) Patent No.: US 8,973,533 B2
(45) Date of Patent: Mar. 10, 2015

(54) LIVESTOCK CONFINEMENT PEN WITH WALL PANEL HAVING DIVIDED OPENING

(71) Applicants: Lance T. Hampel, Fredericksburg, TX (US); Edward G. Wolk, Allenton, WI (US)

(72) Inventors: Lance T. Hampel, Fredericksburg, TX (US); Edward G. Wolk, Allenton, WI (US)

(73) Assignee: L. T. Hampel Corp., Germantown, WI (US)

( * ) Notice: Subject to any disclaimer, the term of this patent is extended or adjusted under 35 U.S.C. 154(b) by 83 days.

(21) Appl. No.: 13/633,499

(22) Filed: Oct. 2, 2012

(65) Prior Publication Data

US 2013/0081575 A1 Apr. 4, 2013

Related U.S. Application Data

(60) Provisional application No. 61/542,576, filed on Oct. 3, 2011.

(51) Int. Cl.
*A01K 1/00* (2006.01)
*B29C 51/26* (2006.01)
*B29L 31/00* (2006.01)

(52) U.S. Cl.
CPC ............. *B29C 51/267* (2013.01); *A01K 1/0088* (2013.01); *B29L 2031/7126* (2013.01)
USPC ........................................................ 119/502

(58) Field of Classification Search
CPC ... A01K 1/005; A01K 1/0011; A01K 1/0029; A01K 1/0035; A01K 1/0088; A01K 1/02; A01K 1/0209

USPC ......... 119/416, 444, 445, 446, 447, 448, 449, 119/450, 452, 453, 454, 502, 503, 506, 507, 119/514, 522, 751, 752, 512, 513, 515, 521, 119/474, 524; 256/1, 19; 160/180; 446/476, 446/478, 479, 482; 49/169

See application file for complete search history.

(56) References Cited

U.S. PATENT DOCUMENTS

| | | | | |
|---|---|---|---|---|
| 3,222,237 | A * | 12/1965 | McKelvy | 156/177 |
| 3,754,676 | A * | 8/1973 | Box | 220/324 |
| 3,968,895 | A * | 7/1976 | Barnes et al. | 220/1.5 |
| 4,180,176 | A * | 12/1979 | Galer | 217/57 |
| 5,758,855 | A * | 6/1998 | Jordan et al. | 248/346.01 |
| 6,059,491 | A * | 5/2000 | Striefel et al. | 405/111 |
| 6,294,114 | B1 * | 9/2001 | Muirhead | 264/40.6 |
| 6,383,084 | B1 * | 5/2002 | McEachen et al. | 472/116 |
| D466,690 | S * | 12/2002 | Walsh | D34/38 |
| 6,823,639 | B2 * | 11/2004 | Hampel | 52/598 |
| 7,201,116 | B2 * | 4/2007 | Axelrod | 119/496 |
| 7,487,744 | B1 * | 2/2009 | Goldberg et al. | 119/453 |
| 7,665,982 | B2 * | 2/2010 | Lucier et al. | 425/508 |
| D656,687 | S * | 3/2012 | VanBuuren et al. | D30/119 |
| 8,186,306 | B2 * | 5/2012 | Hampel | 119/514 |

* cited by examiner

*Primary Examiner* — Rob Swiatek
*Assistant Examiner* — Ebony Evans
(74) *Attorney, Agent, or Firm* — Quarles & Brady LLC

(57) ABSTRACT

A wall panel for a livestock confinement pen made of a hollow plastic twin sheet thermoformed body with a grid divider received in an opening of the body between the two sides of the body. One side has flanges by the opening to receive a cover cut from the other side over the opening.

7 Claims, 13 Drawing Sheets

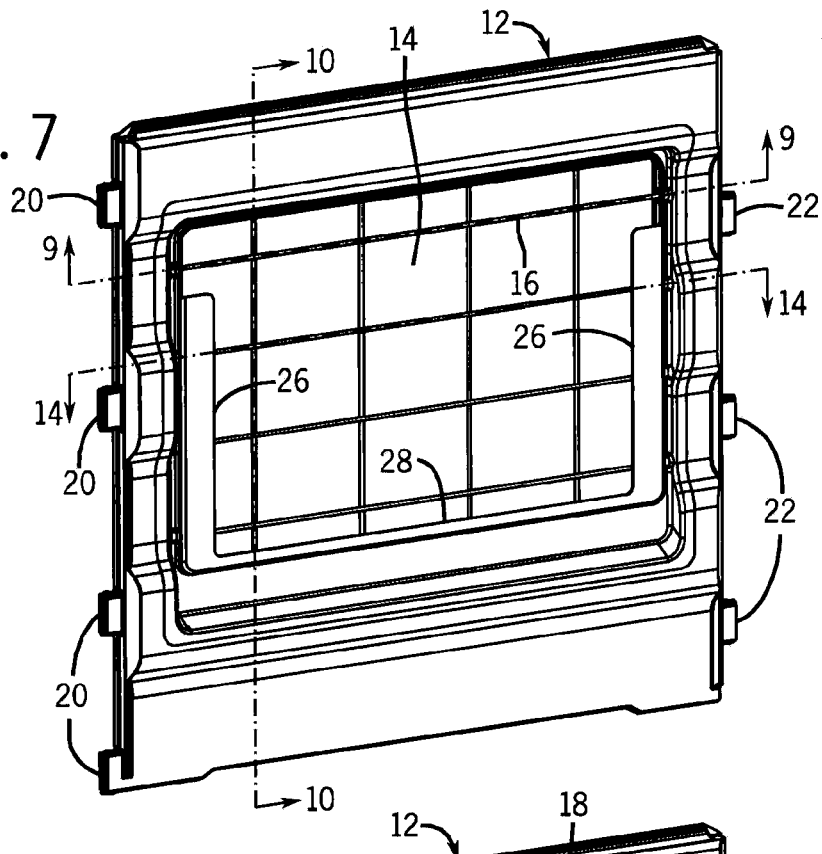
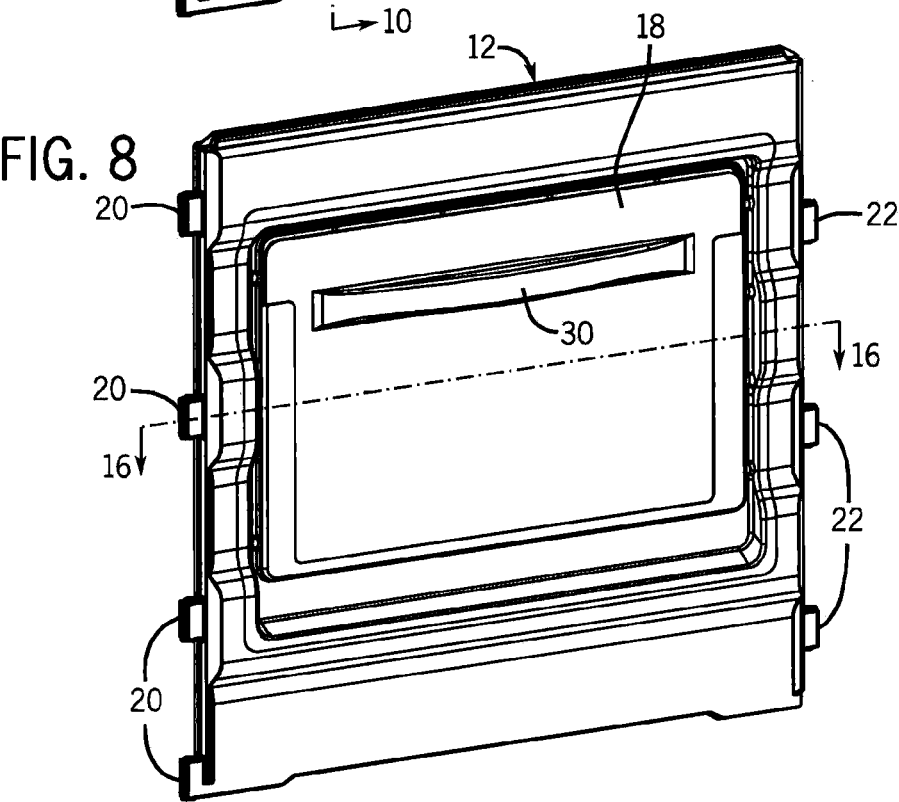

LIVESTOCK CONFINEMENT PEN WITH WALL PANEL HAVING DIVIDED OPENING

CROSS-REFERENCE TO RELATED APPLICATIONS

This claims the benefit of U.S. Provisional Patent Application No. 61/542,576 filed Oct. 3, 2011, which is hereby incorporated by reference for all purposes.

STATEMENT CONCERNING FEDERALLY SPONSORED RESEARCH OR DEVELOPMENT

Not applicable.

FIELD OF THE INVENTION

This invention relates to livestock confinement systems, and particularly to indoor livestock confinement systems.

BACKGROUND OF THE INVENTION

Indoor livestock confinement systems are well known in the art for confining animals that are not well suited to living in a free range environment. Many prior art systems succeed in providing the primary function of livestock confinement, but do not succeed in addressing at least one of the following design aspects, including isolating individual animals, providing controlled visual and tactile contact between adjacent animals, providing components that are easily sanitized, providing adequate ventilation, providing adequate accessibility to confined animals, providing components that may be configured to different arrangements, providing portable components, providing durable components, accommodating other functions such as providing feed and water to confined animals, being low cost, and providing components that are effectively shipped and stored. Systems that address more of these aspects provide healthier animals, lower operating costs, and increase operator safety or convenience.

Well known types of livestock confinement systems include pens formed from fencing, wire, or metal gates. However, these types of pens often permit contact between animals confined in adjacent pens. If unrestricted this can be a problem for animals that require isolation from each other at birth, such as dairy calves. Other types of livestock confinement systems include pens with walls formed by wood or masonry. However, pens constructed from wood are not easily sanitized, and pens constructed from masonry are not portable. In addition, such pens also lack in the aspects of ventilation, durability, and configurability.

Further types of livestock confinement systems include components made of both steel and plastic. These pens typically include metal frames that are bolted to a larger structure, such as the floor or wall of a building. Plastic panels are supported by the frame and a metal front door is hinged from the frame. However, these types of pens are not portable since they are fastened to a larger structure. Some designs include large steel hoops over the front door for stability. Such designs are not fastened to a larger structure, providing portability. However, the large steel hoop can be heavy and difficult to carry.

In addition, many of the previously mentioned designs do not succeed in addressing the design aspect of providing adequate ventilation. Providing adequate ventilation is necessary to remove gases emitted from animal waste. This issue is typically addressed by providing constant air movement by using fans or placing the confinement system inside a wall-less building. However, these solutions can create drafts that can be harmful to the confined animals. In addition, the prior designs do not succeed in addressing the need to provide controlled visual and tactile contact between adjacent animals in an effective manner.

SUMMARY OF THE INVENTION

The present invention provides a livestock confinement pen, which may be effectively used as a calf pen. A pen of the present invention has at least one wall panel with an opening sufficiently large to provide visual and tactile contact between animals, which may be calves, on opposite sides of the wall opening.

In one aspect, the opening is restricted by being covered with an open area divider. The open area divider can be provided by a screen, grid, grate or mesh, or other partitions that divide the opening into smaller openings and restrict passage through the overall opening.

If the divider is a screen, grid, grate or mesh, a twin sheet molding process can be used to mold the divider as an insert into the wall panel so that it is captured between the two sheets of plastic that make up the wall panel. The insertion of the divider is accomplished without warpage or buckling of the plastic panel when it cools, and results in a secure fit of the divider in the opening.

After molding, the wall panel is removed from the mold and subjected to a trimming operation. Preferably, on one side of the divider, one of the sheets is trimmed to provide guide flanges on the sides and bottom of the opening to hold a cover over the opening that is slid in from the top of the space between the guide flanges and the divider. On the other side of the divider, the other plastic sheet is trimmed to provide the cover that is slid between the guide flanges and the divider to close off the opening, like during extremely cold weather, or to close off contact between animals on opposite sides of the wall.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 7 is a front perspective view of the rear panel with the opening uncovered;

FIG. 8 is a view like FIG. 7 but with the opening covered;

DETAILED DESCRIPTION OF THE PREFERRED EMBODIMENT

Figure 1:
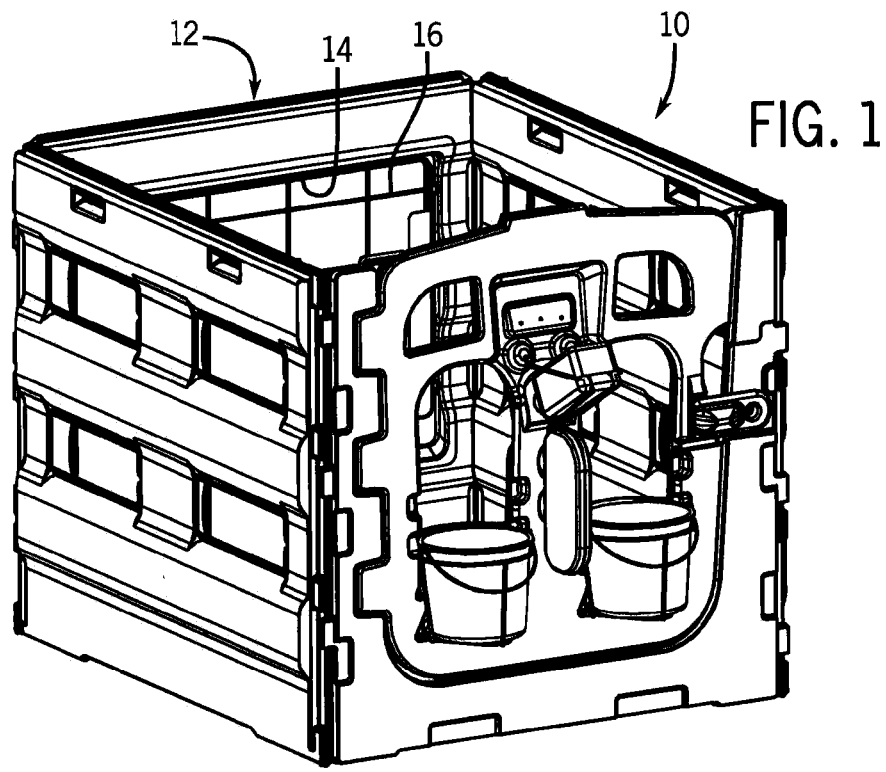
FIG. 1 is a front perspective view of a pen having a rear panel that incorporates the invention, shown with the opening in the rear panel uncovered.
Figure 2:
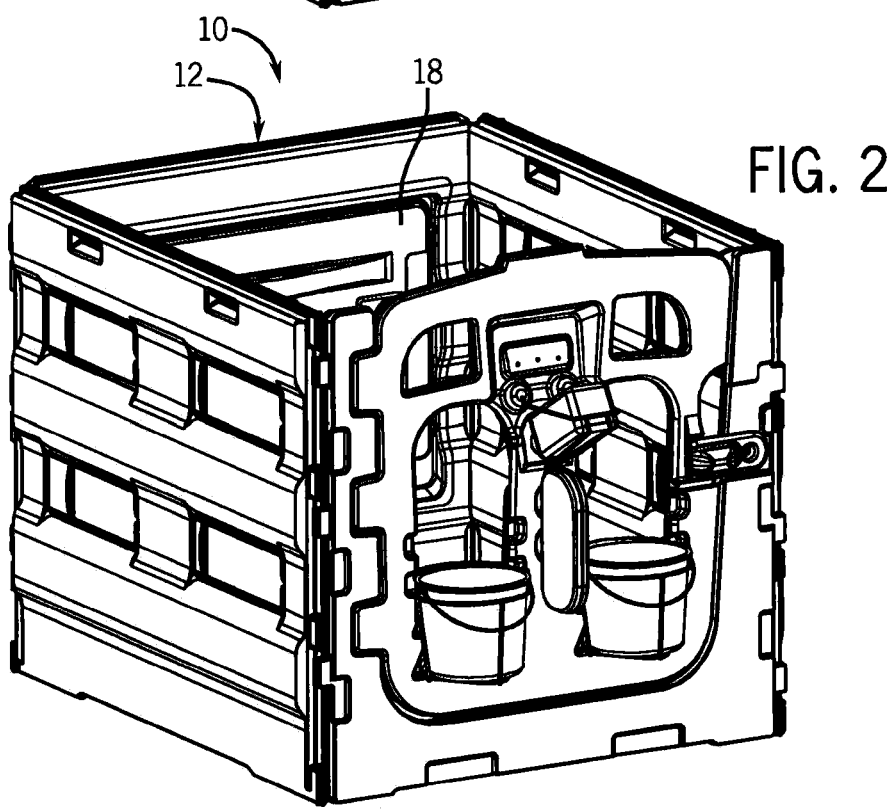
FIG. 2 is a view like FIG. 1, with a cover installed over the opening in the rear panel.
Figure 3:
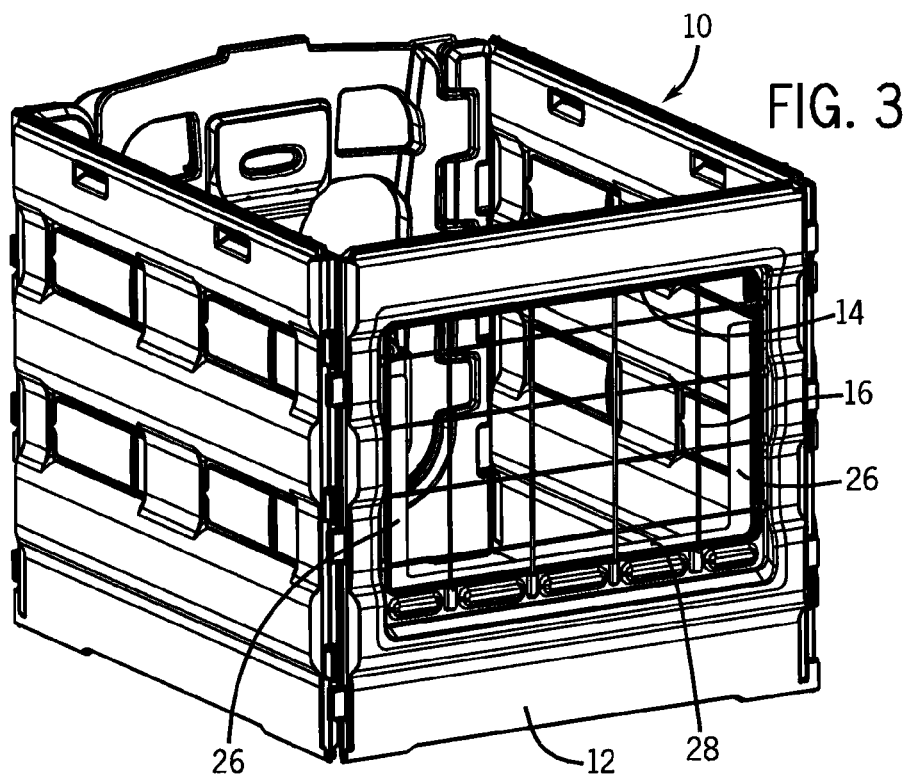
FIG. 3 is a view like FIG. 1 (opening uncovered) but from the rear of the pen.
Figure 4:
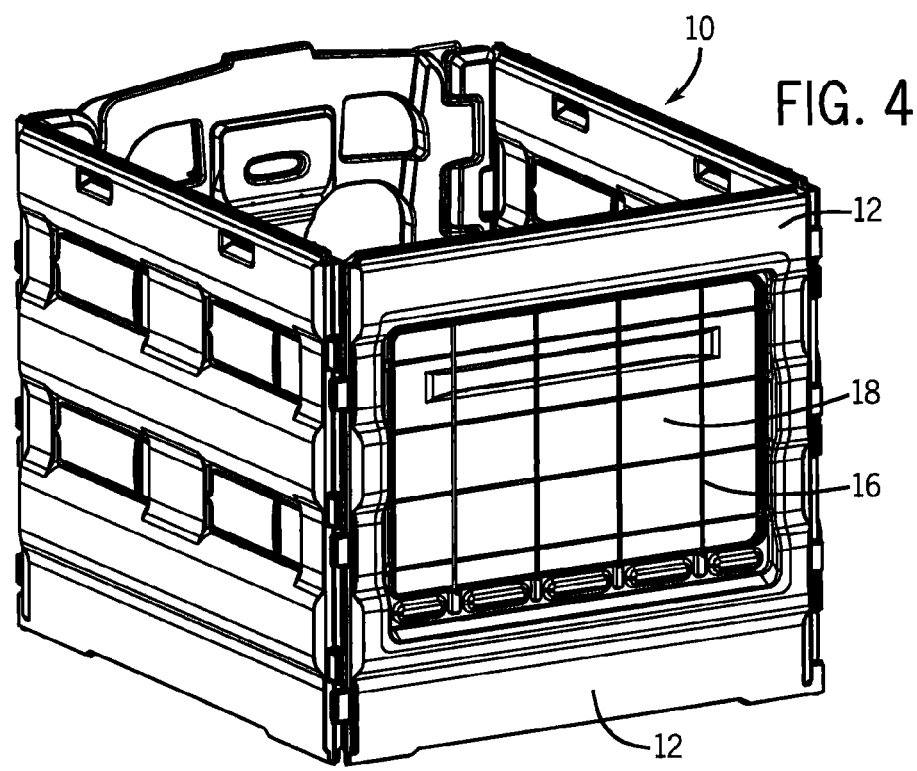
FIG. 4 is a view like FIG. 2 (opening covered) but from the rear of the pen.
Figure 5:
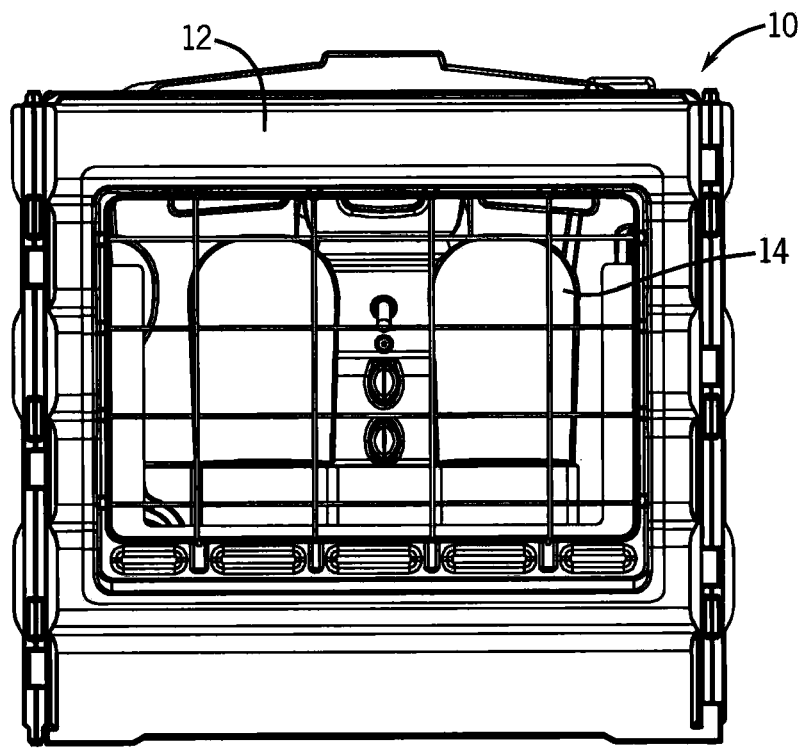
FIG. 5 is a rear plan view of the pen with the opening in the rear panel uncovered.

Twin-sheet thermoforming yields a finished part that is double walled, having inner and outer sheets, with a varying amount of space between them. The two sheets of thermo plastic are married in the molding machine and typically fused together in an invisible unbreakable seam completely, or nearly so, around the perimeter and in various other areas advantageous to the application. Twin-sheet thermoforming requires two sheets of plastic heated simultaneously and two molds mounted face to face in the molding machine. Typically twin-sheeting is performed on a specially configured thermoforming machine of which there are many sizes and the sheets are clamped and the molds placed in a horizontal position. Twin-sheet thermoforming requires a system of clamps to hold the sheet when it is heated, and to hold it in place over the mold while it is being formed.

Referring to the figures, and especially FIGS. 1, 2, 13 and 14, the invention provides a panel for a livestock pen 10 constructed generally as described in U.S. Pat. No. 8,186,306 issued May 29, 2012 for Livestock Confinement Pen, which is hereby incorporated by reference for all purposes, but having a wall panel 12 having an opening 14 that is restricted by a divider 16 and can be closed by a cover 18. The wall panel 12 has tabs 20 and 22 at its vertical edges so that it can be assembled into a pen in the manner described in U.S. Pat. No. 8,186,306. The wall panel 12 may be at the rear or sides of the pen 10, or any other panel that is not the door panel.

Any shaped hollow part can be twin-sheet thermoformed but the most typical applications are large rectangular parts with only several inches or less separating the walls. In the embodiment illustrated, a fabricated steel wire mesh 16, for example made of ¼" rod with 6"×8" openings to create 6"×8" sub-openings within the overall opening 14, is placed onto the first sheet of plastic that has been heated and vacuumed to the lower mold. The sub-openings could be larger or smaller, but 6×8 inches, 3×5 inches or other sizes in a range that permits substantial calf to calf contact, e.g., 2×2 to 8×8, are preferred as they permit some contact but not too much or too little and prevent the calf's head from getting stuck. The second sheet of plastic is heated and vacuumed to the upper mold. Then the upper and lower molds are pressed together with the steel wire mesh between the two sheets of plastic, thus encapsulating the steel wire mesh within the two sheets of plastic that are now sealed at the edges.

Figure 6:
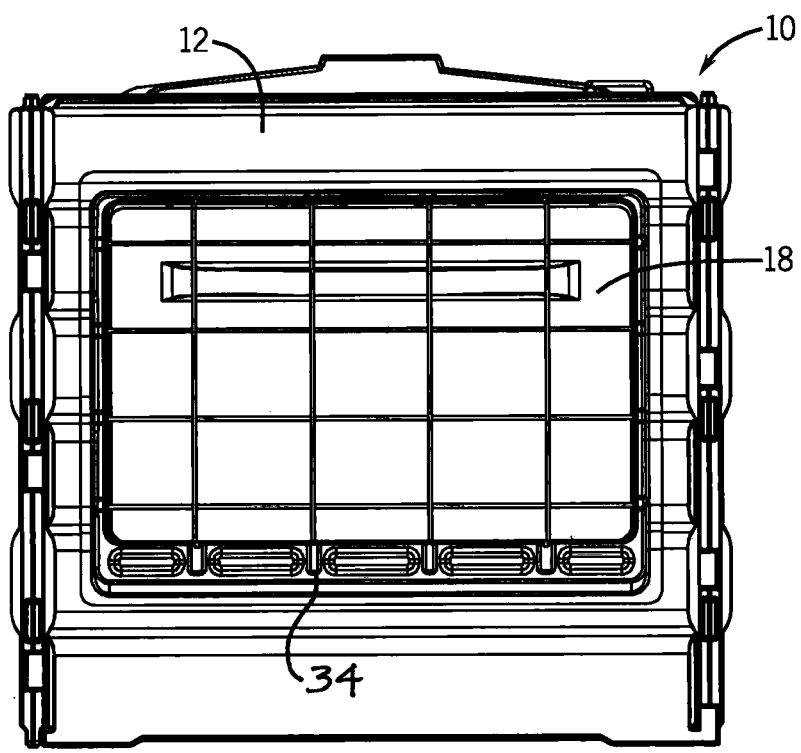
FIG. 6 is a rear plan view of the pen with the opening in the rear panel covered.
Figure 9:
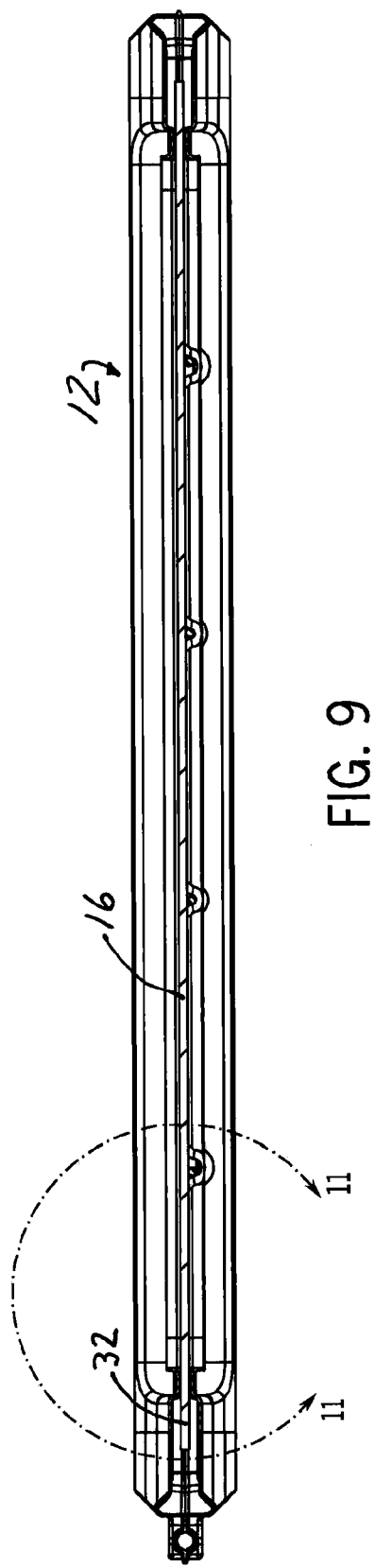
FIG. 9 is a cross-sectional view from the plane of the line 9-9 of FIG. 7.
Figure 10:
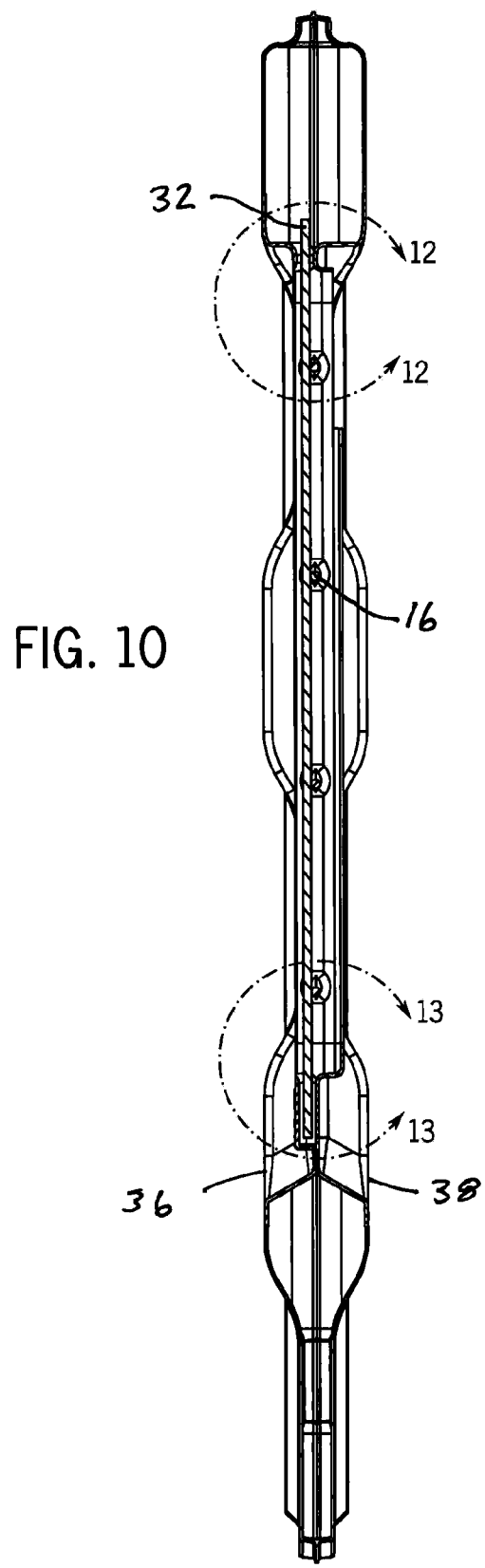
FIG. 10 is a cross-sectional view from the plane of the line 10-10 of FIG. 7.
Figure 11:
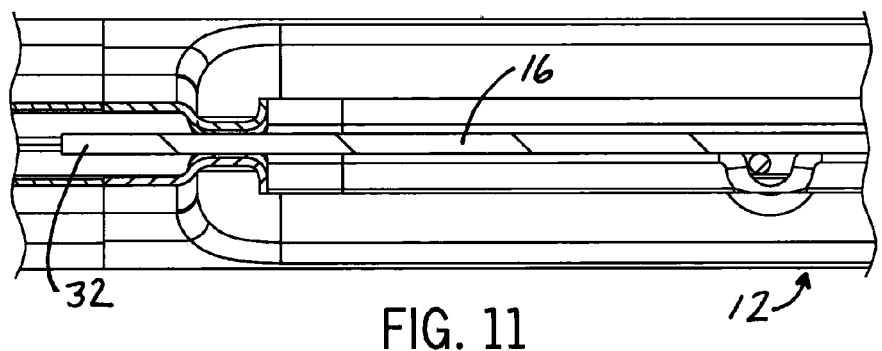
FIG. 11 is a detail view of area 11-11 of FIG. 9.
Figure 12:
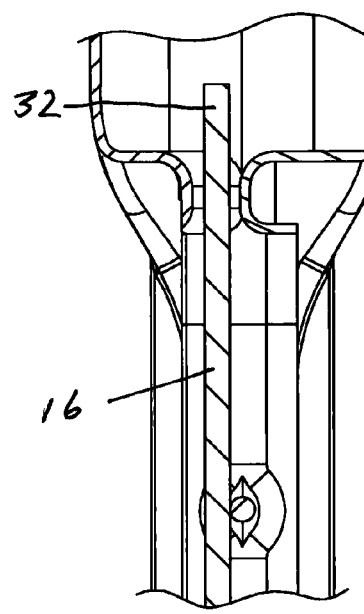
FIG. 12 is a detail view of area 12-12 of FIG. 10.

The area where the steel wire mesh 16 is inserted is designed in such a way as to allow the plastic to slide over the ends of the steel wire mesh while it shrinks, in both directions, thus keeping the plastic from warping or twisting, as particularly illustrated in FIGS. 9-15. This is accomplished by extending the ends 20 of the rods of the mesh 16 a substantial distance into the space between the two sheets of the wall panel 12, for example approximately 3 inches, but in any event far enough so that the forces an animal places on the mesh cannot bend it enough so that it gets pushed out of the opening 14. The two sheets are pinched off around the ends of the rods so that the pinch offs are spaced further apart than the diameter of the rods, for example maybe ⅝ inches apart for a ¼ inch rod, with the rod centered or received off-center in the ⅝ inch opening. As shown in FIG. 6, the rod ends 20 extend through the pockets that receive them on the top and sides of the opening, and on the bottom of the opening the pockets have bottoms 24 where the two sheets of plastic are pinched off and welded to one another below the rod ends 20. This is also illustrated in FIGS. 9-15. When the wall panel cools, it shrinks around the rods so that the mesh is held tightly within the wall panel and cannot be pushed out with forces that might be imparted to it by livestock when the panel is at room temperature.

Figure 13:
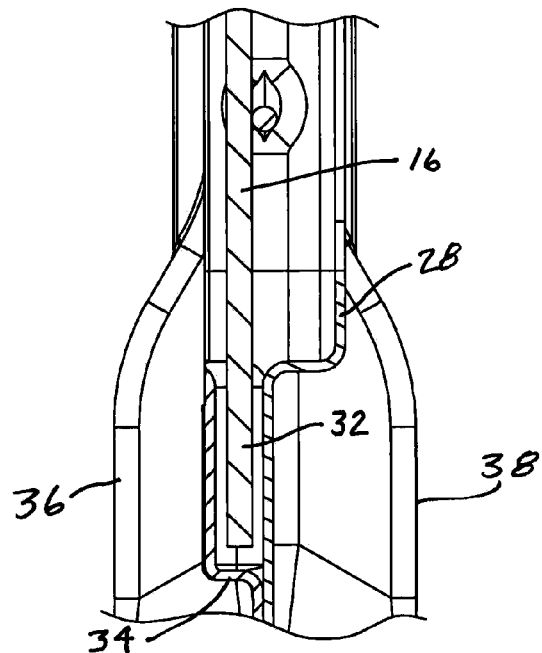
FIG. 13 is a detail view of area 13-13 of FIG. 10.
Figure 14:
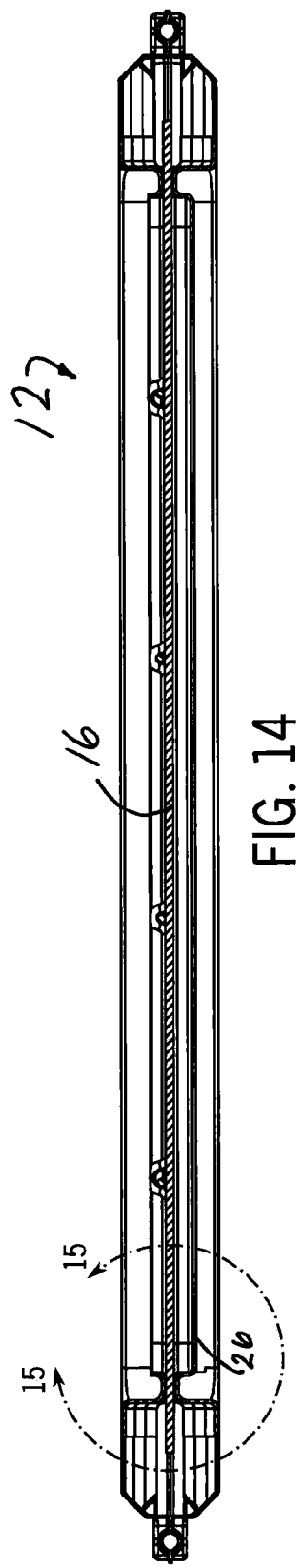
FIG. 14 is a cross-sectional view from the plane of the line 14-14 of FIG. 7.
Figure 15:
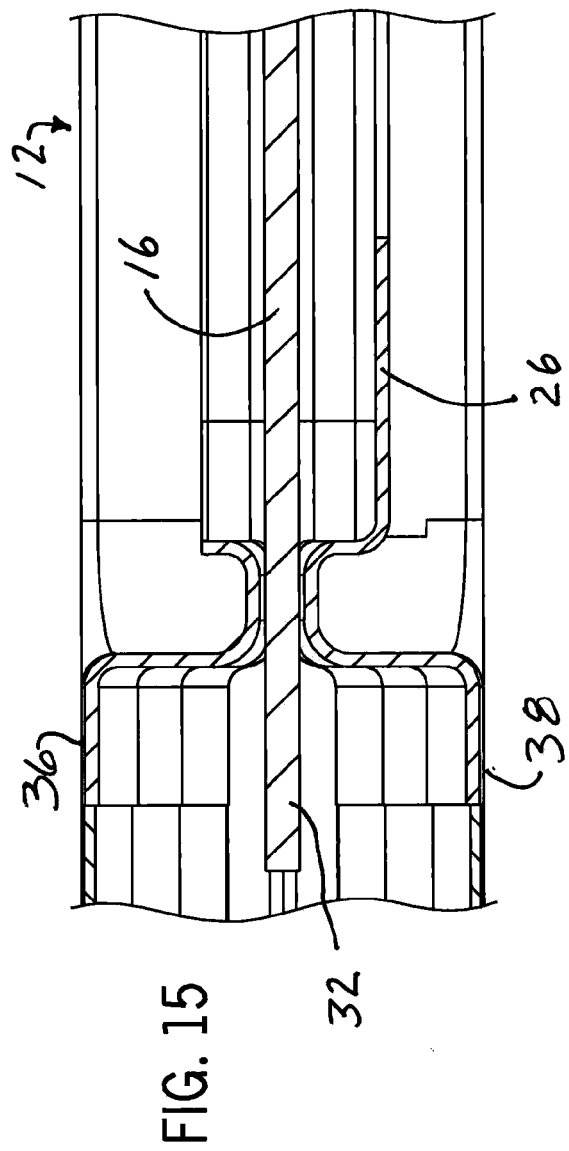
FIG. 15 is a detail view of area 15-15 of FIG. 14.
Figure 16:
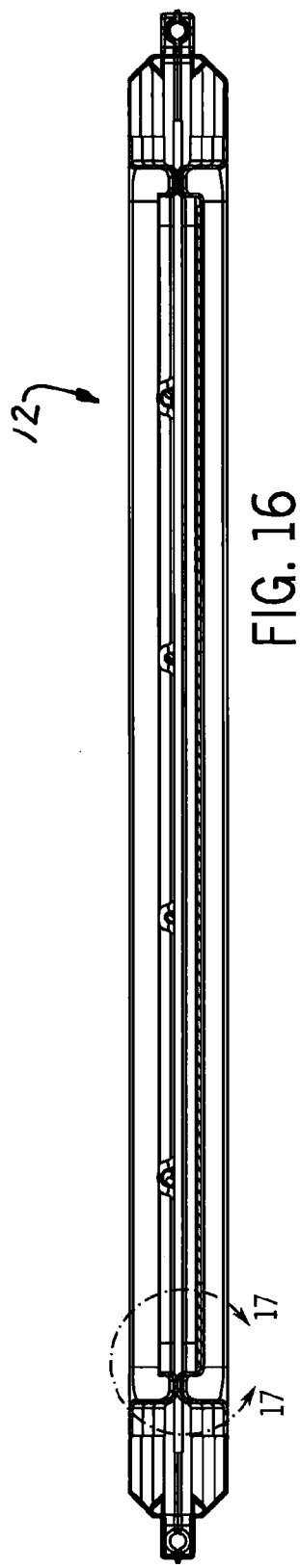
FIG. 16 is a cross-sectional view from the plane of the line 16-16 of FIG. 8.
Figure 17:
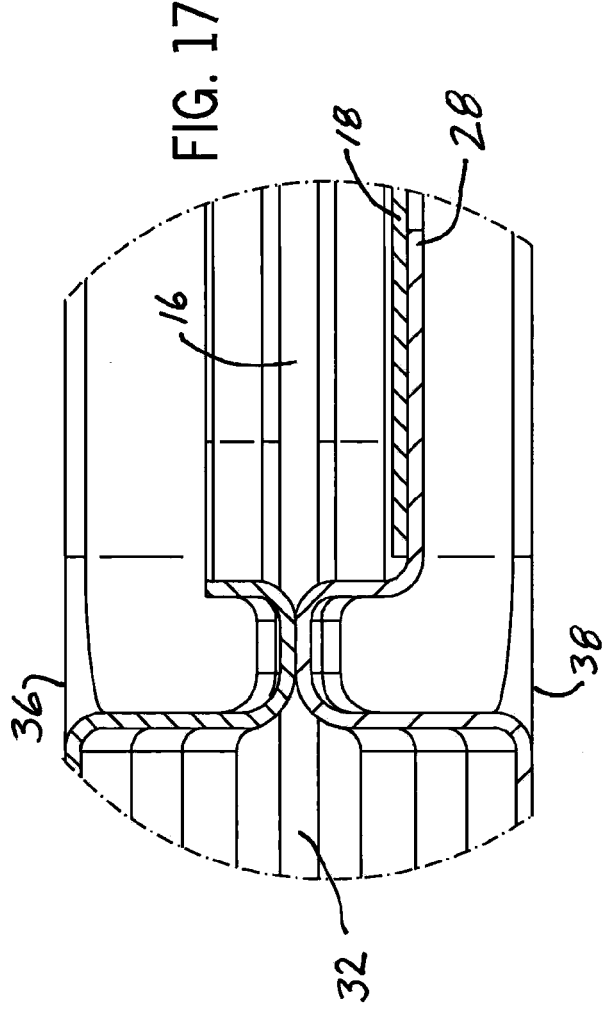
FIG. 17 is a detail view of area 17-17 of FIG. 16.

Referring particularly to FIGS. 13-15, one side 26 of the finished twin-sheet part over the area of the opening 14 can be trimmed to create a molded rectangular cover 18 that will be used to cover the opening 14 of the encapsulated steel wire mesh, in case of cold weather or the need to isolate animals on opposite sides of the panel 12 from visual or tactile contact with one another. The cover 18 is cut out from the plastic sheet on one side 26 of the divider 16 and has molded into it a handle 30, so that it can be grabbed and slid into the area between flanges 26 and 28 and the divider, on the opposite side 28 of where the cover 18 was cut out. On that side of the divider, opposite of where the panel 18 was cut out from, the plastic sheet over the opening 14 is cut out to create the flanges 26 and 28.

Figure 18:
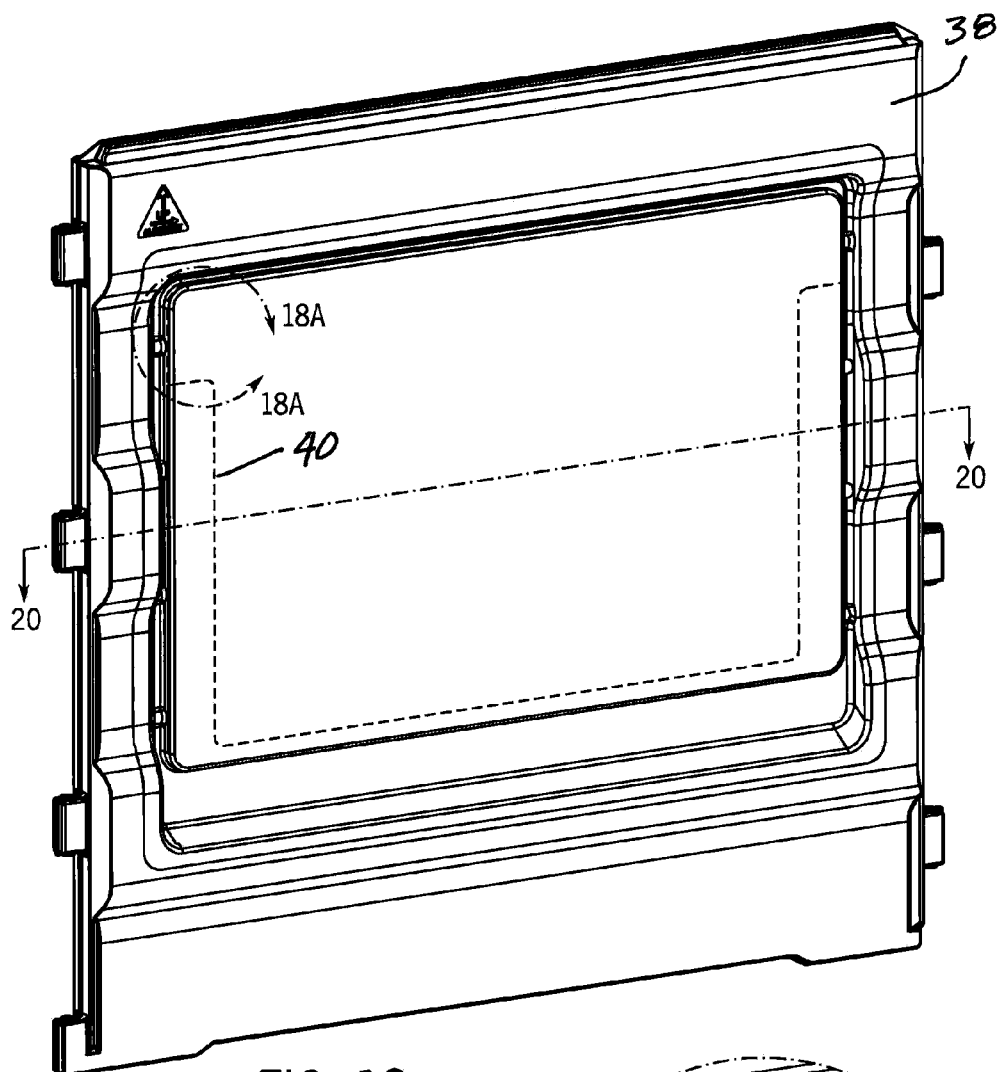
FIG. 18 is a front perspective view of the rear panel after twin sheet thermoforming but prior to making the cut to define the opening on the front side of the panel with side and bottom flanges to hold the cover over the opening.
Figure 18A:
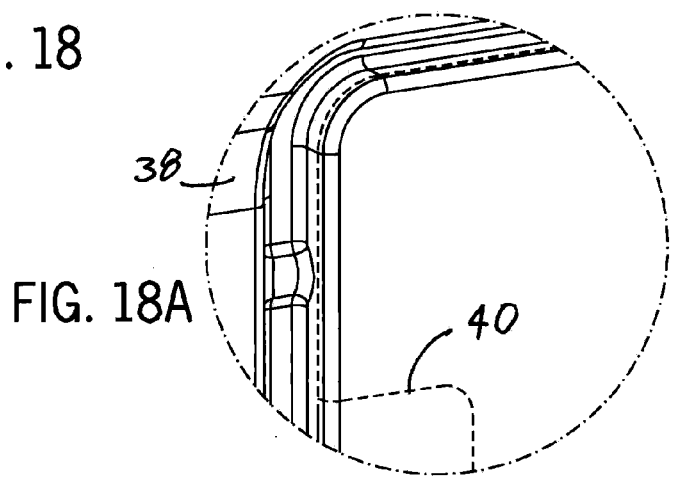
FIG. 18A is a detail view of area 18A-18A of FIG. 18.
Figure 19:
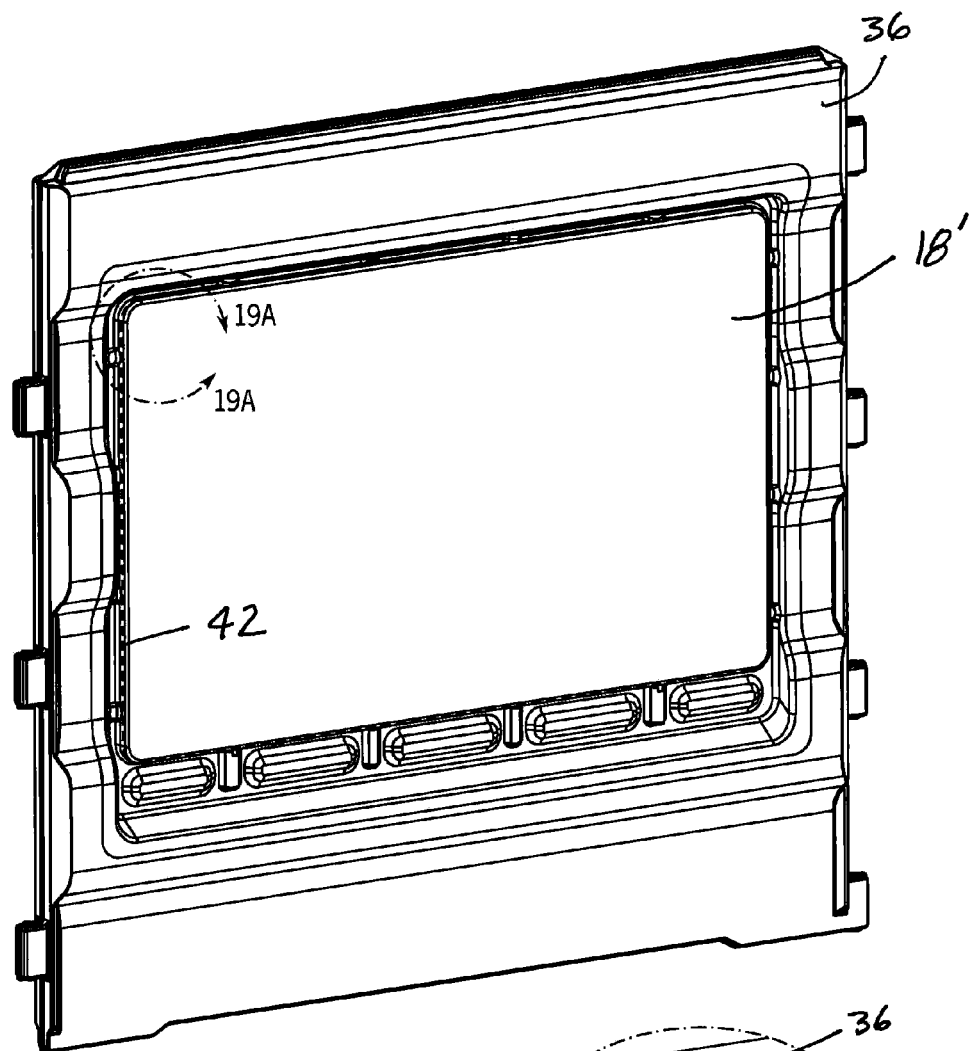
FIG. 19 is a rear perspective view of the rear panel after twin sheet thermoforming but prior to making the cut to define the opening on the rear side of the panel with the cut-out panel serving as the cover.
Figure 19A:
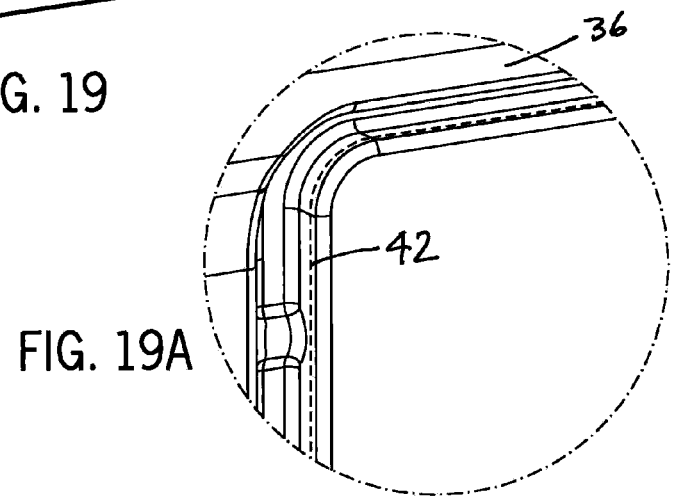
FIG. 19A is a detail view of area 19A-19A of FIG. 19.
Figure 20:
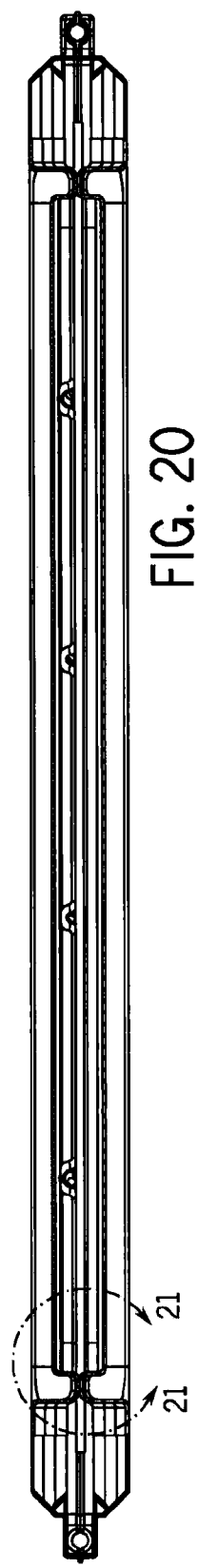
FIG. 20 is a cross-sectional view from the plane of the line 20-20 of FIG. 18.
Figure 21:
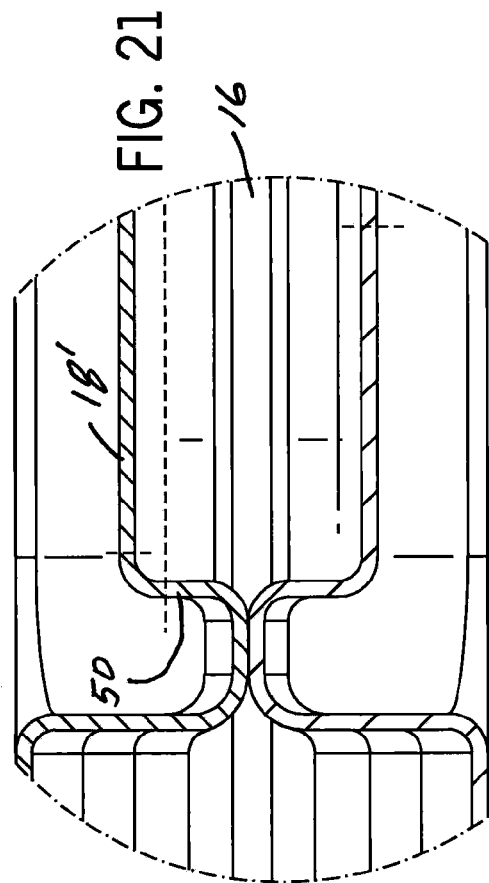
FIG. 21 is a detail view of area 21-21 of FIG. 20, illustrating with dashed lines where the edges of the opening are on the front and rear sides of the rear panel and where the edge of the cut-out is that defines the cover.
Figure 22:
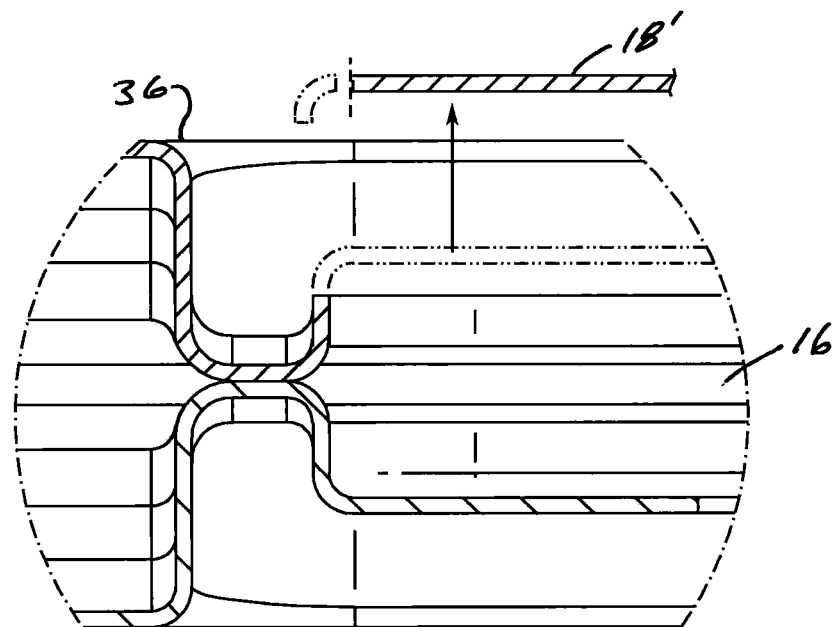
FIG. 22 is a detail view like FIG. 21 but illustrating the opening and the cover panel after the cuts have been made.
Figure 23:
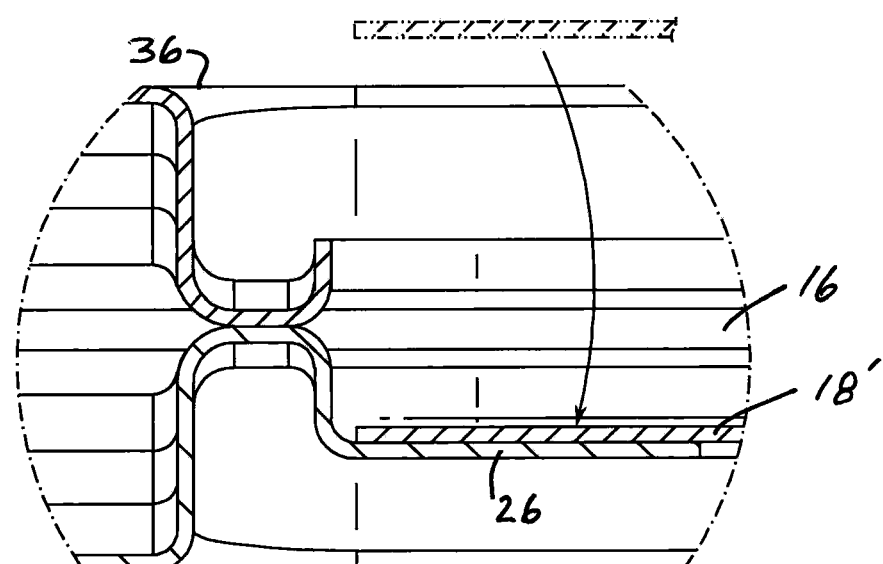
FIG. 23 is a detail view like FIG. 22 but illustrating the cover panel held by the flanges on the front of the rear panel over the opening.

Referring to FIGS. 18-21, the uncut wall panel 12 after thermoforming but before trimming is disclosed, with line 40 (FIGS. 18-18A) illustrating the cut line on side 38 that defines the opening and the flanges on that side, and line 42 (FIGS. 19-19A) illustrating the cut line on side 36 that defines the cover panel 18' (no handle on this embodiment). It is noted that on side 38 at the top of the side flanges 28 the cut line turns inwardly to define a space at the top of the flanges between the inside surface of the flanges and the divider 16 into which the cover 18 or 18' can be slid. The cut-out panel from side 38, which is T-shaped, is discarded and recycled. Referring to FIGS. 20-22, on side 36, the cut line straddles the intersection between the cover 18' and the flanges 50, so that the entire corner that joins panel 18' and the flanges 50 in the uncut panel is removed. This leaves the cover 18' flat after the cut is made. FIG. 22 shows the removed corner and FIG. 23 shows the cover 18' moved from side 36 to being received by the flanges on side 38.

Preferred embodiments of the invention have been described in considerable detail. Many modifications and variations to the preferred embodiment described will be apparent to a person of ordinary skill in the art. Therefore, the invention should not be limited to the embodiment described.

We claim:

1. A livestock confinement pen, comprising at least two pen spaces, each for containing at least one animal, with one wall panel between the two spaces, the wall panel having an opening sufficiently large to provide visual and tactile contact between animals on opposite sides of the wall opening and wherein the opening is restricted by being divided into smaller sub-openings by a divider; and
further comprising a cover and flanges partially overlapping edges of the opening so as to receive the cover in a sliding fit between the flanges and the divider so as to at least partially block the opening;
wherein the panel comprises two plastic sheets fused together and the flanges are formed from one of the sheets and the cover is formed from the other of the sheets.

2. A livestock confinement pen as in claim 1, wherein the opening is divided by at least one of a screen, grid, grate, mesh, or partition that has bars that restrict passage through the overall opening and that is fixed to the wall panel by the bars extending into the wall panel at edges of the wall panel that define the opening.

3. A livestock confinement pen as in claim 1, wherein the divider is inserted between two plastic panels that make up the at least one wall panel so that it is captured against movement between the two plastic panels.

4. A method of making a wall panel for a livestock confinement pen, comprising:
placing a divider between two plastic sheets, the divider comprising interconnected bars that divide the interior of the divider into multiple openings through the divider;
thermoforming the two sheets in a twin sheet thermoforming machine to fuse the two sheets together at select locations and draw a vacuum on each sheet so as to mold an exterior surface of each sheet against molds held in the machine, creating a hollow plastic body with spaced apart locations in which the two sheets are fused to one another, with the divider between the two sheets and the two sheets molded around bars of the divider;
thereafter cutting each sheet in the area over the divider so as to create an opening through the body at the location of the divider so that the multiple openings through the divider are exposed;
wherein a cover or the opening is cut from one of the sides of the body over the divider.

5. A wall panel as claimed in claim 4, wherein the cutting is performed so as to define flanges on one side of the body to hold a cover over the opening.

6. A wall panel as claimed in claim 4, wherein the sheets are molded under vacuum to have pockets that receive ends of the divider that extend through the pockets.

7. A wall panel as claimed in claim 6, wherein the pockets are wider than the ends and the sheets are fused to one another at sides of the pockets along side the ends.

* * * * *

UNITED STATES PATENT AND TRADEMARK OFFICE
CERTIFICATE OF CORRECTION

| | | |
|---|---|---|
| PATENT NO. | : 8,973,533 B2 | Page 1 of 1 |
| APPLICATION NO. | : 13/633499 | |
| DATED | : March 10, 2015 | |
| INVENTOR(S) | : Lance T. Hampel and Edward G. Wolk | |

It is certified that error appears in the above-identified patent and that said Letters Patent is hereby corrected as shown below:

In the Claims

Col. 6, Line 18, Claim 4, "cover or the opening" should be --cover for the opening--

Signed and Sealed this
Twenty-first Day of July, 2015

Michelle K. Lee
*Director of the United States Patent and Trademark Office*